US010941302B2

(12) United States Patent
Millero et al.

(10) Patent No.: US 10,941,302 B2
(45) Date of Patent: Mar. 9, 2021

(54) POWDER COATING COMPOSITION

(71) Applicant: PPG Industries Ohio, Inc., Cleveland, OH (US)

(72) Inventors: Edward R. Millero, Gibsonia, PA (US); Robert Cavlovich, Gibsonia, PA (US); Anthony M. Chasser, Allison Park, PA (US); Troy Larimer, North Huntingdon, PA (US); Julia Pacilio, Cleveland, OH (US); John Robert Schneider, Allison Park, PA (US); Kathryn A. Shaffer, Bethel Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 317 days.

(21) Appl. No.: 15/914,297

(22) Filed: Mar. 7, 2018

(65) Prior Publication Data

US 2019/0276678 A1 Sep. 12, 2019

(51) Int. Cl.
| | |
|---|---|
| *C09D 5/03* | (2006.01) |
| *C09D 127/06* | (2006.01) |
| *C09D 123/26* | (2006.01) |
| *C09D 133/12* | (2006.01) |
| *C09D 167/00* | (2006.01) |
| *C08J 3/12* | (2006.01) |
| *C08J 3/00* | (2006.01) |
| *C09D 177/06* | (2006.01) |
| *C09D 177/00* | (2006.01) |
| *C09D 133/08* | (2006.01) |
| *C09D 123/00* | (2006.01) |
| *C09D 123/04* | (2006.01) |

(52) U.S. Cl.
CPC .............. *C09D 5/031* (2013.01); *C08J 3/005* (2013.01); *C08J 3/12* (2013.01); *C09D 5/03* (2013.01); *C09D 123/00* (2013.01); *C09D 123/04* (2013.01); *C09D 123/26* (2013.01); *C09D 127/06* (2013.01); *C09D 133/08* (2013.01); *C09D 133/12* (2013.01); *C09D 167/00* (2013.01); *C09D 177/00* (2013.01); *C09D 177/06* (2013.01); *C08J 2323/26* (2013.01); *C08J 2327/06* (2013.01); *C08J 2333/12* (2013.01); *C08J 2367/00* (2013.01); *C08J 2367/02* (2013.01); *C08J 2367/04* (2013.01); *C08J 2377/06* (2013.01); *C08J 2433/12* (2013.01); *C08J 2463/00* (2013.01); *C08J 2477/06* (2013.01); *C08L 2205/035* (2013.01)

(58) Field of Classification Search
CPC .... C09D 5/031; C09D 127/06; C09D 123/26; C09D 133/12; C09D 167/00; C09D 177/06; C09D 177/00; C09D 133/08; C09D 123/00; C09D 123/04; C09D 5/03; C08J 3/12; C08J 3/005; C08J 2367/00; C08J 2377/06; C08J 2433/12; C08J 2477/06; C08J 2327/06; C08J 2463/00; C08J 2367/02; C08J 2367/04; C08J 2323/26; C08J 2333/12; C08L 2205/036

See application file for complete search history.

(56) References Cited

U.S. PATENT DOCUMENTS

| | | | |
|---|---|---|---|
| 4,014,956 A * | 3/1977 | Smith | C09D 127/06 524/114 |
| 4,046,728 A | 9/1977 | Harmuth | |
| 4,113,681 A * | 9/1978 | Harmuth | C09D 127/06 523/437 |
| 4,192,787 A | 3/1980 | Salmon | |
| 6,184,311 B1 | 2/2001 | O'Keeffe et al. | |
| 6,270,855 B1 | 8/2001 | Jung et al. | |
| 7,501,150 B2 | 3/2009 | Sacripante et al. | |
| 7,625,973 B2 | 12/2009 | Ambrose et al. | |
| 8,030,396 B2 | 10/2011 | Ambrose et al. | |
| 8,461,250 B2 | 6/2013 | Schollenberger et al. | |
| 2004/0225027 A1 | 11/2004 | Moens et al. | |
| 2015/0291804 A1 | 10/2015 | Martinoni et al. | |
| 2016/0102222 A1 | 4/2016 | Fitzgerald et al. | |
| 2017/0158869 A1 | 6/2017 | Martinoni et al. | |
| 2017/0320629 A1 | 11/2017 | Han et al. | |

FOREIGN PATENT DOCUMENTS

| | | | |
|---|---|---|---|
| DE | 102006057838 A1 | 6/2008 | |
| EP | 0600546 A1 | 6/1994 | |
| EP | 1283246 A1 | 2/2003 | |
| EP | 1541640 A1 | 6/2005 | |
| EP | 1165712 B1 | 6/2008 | |
| EP | 2447059 A2 | 5/2012 | |
| EP | 2746353 A1 | 6/2014 | |

(Continued)

*Primary Examiner* — Michael C Miggins

(74) *Attorney, Agent, or Firm* — Michael J. Grese

(57) ABSTRACT

A powder coating composition grindable at non-cryogenic temperatures includes: (a) a first polymer having a number average molecular weight (Mn) of more than 1,000 and a Tg of at least 40° C.; (b) a second polymer having a Tm of at least 100° C.; and optionally (c) a cross-linker. The first polymer and the second polymer are different from one another, and each of the first and second polymers have less than 25 wt % fluorine-containing monomeric units, with wt % based on the total weight of the monomeric units in each polymer. Upon grinding at a temperature above 4° C. the coating composition has an average particle size from 15 to 150 microns. Further coating compositions, methods of preparing coating compositions, coating systems, and substrates coated with a powder coating composition are also disclosed.

38 Claims, No Drawings

(56) References Cited

FOREIGN PATENT DOCUMENTS

| | | |
|---|---|---|
| JP | 2014148618 A | 8/2014 |
| WO | 9401506 A1 | 1/1994 |
| WO | 03010248 A1 | 2/2003 |
| WO | 2004000958 A1 | 12/2003 |
| WO | 2009095471 A1 | 8/2009 |
| WO | 2011019840 A1 | 2/2011 |
| WO | 2011138431 A1 | 11/2011 |
| WO | 2012118500 A1 | 9/2012 |
| WO | 2012118501 A1 | 9/2012 |
| WO | 2014025411 A1 | 2/2014 |
| WO | 2014065858 A1 | 5/2014 |
| WO | 2015077687 A1 | 5/2015 |
| WO | 2017122169 A1 | 7/2017 |
| WO | 2017122170 A1 | 7/2017 |

* cited by examiner

POWDER COATING COMPOSITION

FIELD OF THE INVENTION

The present invention relates to a powder coating composition grindable at non-cryogenic temperatures, a coating system including the powder coating composition and a method of preparing the powder coating composition.

BACKGROUND OF THE INVENTION

Powder coating compositions including low Tg polymers generally require milling at cryogenic temperatures (at or below 4° C.) in order to obtain the desired particle size of the powder. This process adds an additional processing step of lowering the temperature of the extruded polymer to cryogenic temperatures prior to grinding the polymer, increasing the complexity of forming the powder coating composition. The cryogenic milling step also increases the manufacturing costs associated with forming these powder coating compositions. Powder coatings made without cryogenic grinding are desired.

SUMMARY OF THE INVENTION

The present invention is directed to a powder coating composition grindable at non-cryogenic temperatures including: (a) a first polymer having a number average molecular weight (Mn) of more than 1,000 and a Tg of at least 40° C.; (b) a second polymer having a Tm of at least 100° C.; and (c) a cross-linker, where the first polymer and the second polymer are different from one another and each of the first and second polymers have less than 25 wt % fluorine-containing monomeric units, with wt % based on the total weight of the monomeric units in each polymer, and where upon grinding at a temperature above 4° C. the coating composition has an average particle size from 15 to 150 microns.

The present invention is also directed to a powder coating composition grindable at non-cryogenic temperatures including: (a) a first non-polyester polymer having a number average molecular weight (Mn) of more than 1,000 and a Tg of at least 40° C.; and (b) a second polymer having a Tm of at least 100° C., where the first polymer and the second polymer are different from one another and each of the first and second polymers have less than 25 wt % fluorine-containing monomeric units, with wt % based on the total weight of the monomeric units in each polymer, and where upon grinding at a temperature above 4° C. the coating composition has an average particle size from 15 to 150 microns.

The present invention is also directed to a powder coating composition grindable at non-cryogenic temperatures including: (a) a first polymer having a number average molecular weight (Mn) of more than 1,000 and a Tg of at least 40° C.; and (b) a second polymer including poly(vinyl chloride), the second polymer having a Tm of at least 100° C., where the first polymer and the second polymer are different from one another, and where upon grinding at a temperature above 4° C. the coating composition has an average particle size from 15 to 150 microns.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" undercoat, "a" cross-linker, and the like refer to one or more of these items. Also, as used herein, the term "polymer" refers to prepolymers, oligomers, and both homopolymers and copolymers. The term "resin" is used interchangeably with "polymer."

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention relates to a powder coating composition grindable at non-cryogenic temperatures. As used herein, by "grindable" it is meant that the polymer can be milled using an air classifying mill to an average particle size of less than 200 microns. Non-grindable polymers may not physically be grindable to the average particle size of less than 200 microns using the air classifying mill. As used herein, the term "grinding" refers to milling using an air classifying mill. As used herein, "non-cryogenic temperatures" means temperatures above 4° C.

The present invention may be directed to a powder coating composition grindable at non-cryogenic temperatures including: a first polymer having a number average molecular weight (Mn) of more than 1,000 and a Tg of at least 40° C.; a second polymer having a Tm of at least 100° C.; and a cross-linker. The first polymer and the second polymer are different from one another and each of the first and second polymers have less than 25 wt % fluorine-containing monomeric units, with wt % based on the total weight of the monomeric units in each polymer, such as less than 20 wt %, less than 15%, less than 10 wt %, less than 5 wt %, or less than 1%. The first polymer and second polymer may be completely free (0 wt %) of fluorine-containing monomeric units. Upon grinding at a temperature above 4° C., the coating composition may have an average particle size from 15 to 150 microns.

The present invention may also be directed to a powder coating composition grindable at non-cryogenic temperatures including: a first non-polyester polymer having a number average molecular weight (Mn) of more than 1,000 and a Tg of at least 40° C.; and a second polymer having a Tm of at least 100° C. The first polymer and the second polymer are different from one another and each of the first and second polymers have less than 25 wt % fluorine-containing monomeric units, with wt % based on the total weight of the monomeric units in each polymer, such as less than 20 wt %, less than 15%, less than 10 wt %, less than 5 wt %, or less than 1%. The first polymer and second polymer may be completely free (0 wt %) of fluorine-containing monomeric units. Upon grinding at a temperature above 4° C. the coating composition may have an average particle size from 15 to 150 microns.

The present invention may also be directed to a powder coating composition grindable at non-cryogenic temperatures including: a first polymer having a number average molecular weight ("Mn") of more than 1,000 and a Tg of at least 40° C.; and a second polymer including poly(vinyl chloride), the second polymer having a Tm of at least 100° C. The first polymer and the second polymer are different from one another. Upon grinding at a temperature above 4° C. the coating composition may have an average particle size from 15 to 150 microns.

"Mn", as reported herein, was measured by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da) unless otherwise indicated. Glass transition temperature ("Tg"), as reported herein, was measured by differential scanning calorimetry according to ASTM D3418-15 unless otherwise indicated. Melting temperature ("Tm"), as reported herein, was measured by differential scanning calorimetry according to ASTM D3418-15 unless otherwise indicated. As used herein, average particle size means volume average particle size unless otherwise indicated. The average particle size was determined using laser diffraction analysis unless otherwise indicated. The laser diffraction analysis was performed using a Beckman Coulter LS 13 320 Laser diffraction particle size analyzer (Beckman Coulter Inc. (Brea, Calif.)).

The first polymer used according to the present invention may be either water dispersible or not water dispersible. The first polymer may function as a plasticizer in the powder coating composition. "Function as a plasticizer" means that the inclusion of the polymer enhances the flow of the coating composition during heating and curing and may also impart enhanced flexibility to the cured coating. The first polymer may be acid functional. "Acid functional" means that the polymer includes one or more carboxylic acid groups. The first polymer may have a Tg of at least 40° C., such as at least 45° C. or at least 60° C. The first polymer may be grindable above 4° C. by itself (i.e., not mixed with other components). The first polymer may be a thermoplastic polymer or a thermoset polymer. The first polymer may be cross-linkable. As used herein, "cross-linkable" means that the polymer can form at least one irreversible bond with itself or a crosslinking agent (also referred to herein as a crosslinker).

A "thermoset polymer" is a polymer having functional groups that are reactive with themselves and/or a crosslinking agent, and upon such reaction (referred to as curing), the polymer forms irreversible covalent bonds ("sets"). Once cured or crosslinked, a thermoset polymer will not melt upon the application of heat and is insoluble in solvents. A "thermoplastic polymer" is a polymer produced from components that are not covalently bonded and, as such, can undergo liquid flow upon heating and/or can be soluble in certain solvents. A thermoplastic polymer can be heated to become pliable or moldable and re-solidify upon cooling.

The first polymer may have a Mn of more than 1,000 or more than 2,000. The first polymer may have a Mn of 1,000 to 7,000, such as 1,000 to 5,000, such as 2,000 to 7,000, or such as 2,000 to 5,000. The first polymer may have an Mn of no more than 7,000, no more than 5,000, or no more than 4,000. The first polymer may have a weight average molecular weight ("Mw") of no more than 15,000, such as no more than 12,000, no more than 10,000, or no more than 8,000. Mw, as reported herein, was measured by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da) unless otherwise indicated.

The first polymer may be a polyester polymer or a non-polyester polymer. A "non-polyester polymer" is a polymer that is not prepared by a condensation reaction between an alcohol and a carboxylic acid. The first polymer may include an acrylic resin, a polyamide wax, a polyester, polyester grafted acrylic, a polyurethane, or a mixture thereof.

The second polymer may have a Tg of at least −40° C. The second polymer may have a Tg of from −40° C. to 90° C., or −35° C. to 80° C., or −25° C. to 70° C., or −15° C. to 60° C., or −5° C. to 50° C., or 0° C. to 40° C. The second polymer may have a Tm of at least 100° C. The second polymer may have an Mn of at least 5,000. The second polymer may not be grindable above 4° C. by itself (i.e., when it is not mixed with other components). The second polymer may be a thermoplastic polymer. The second polymer may be not cross-linkable, in that the second polymer may not have sufficient functionality so as to make the second polymer cross-linkable. Thus, the second polymer may have some functionality but not enough so as to form a thermoset material.

As previously mentioned, the first polymer may be grindable above 4° C. by itself while the second polymer may not be grindable above 4° C. by itself. However, the resulting powder coating composition of the present invention may be grindable above 4° C. While not wishing to be bound by a particular theory, it is believed that addition of the first polymer having a high Tg and a low Mn to the second (non-grindable above 4° C.) polymer renders the powder coating composition of the present invention including both the first and the second polymers grindable above 4° C.

The second polymer used according to the present invention may be present in the powder coating composition in an amount greater than 20 percent by weight, or greater than 25 percent by weight, or greater than 30 percent by weight, or greater than 35 percent by weight, or greater than 40 percent by weight, or greater than 45 percent by weight, or greater than 50 percent by weight, or greater than 55 percent by weight, or greater than 60 percent by weight, or greater than 65 percent by weight, or greater than 70 percent by weight, based on total solids weight of the first polymer and the second polymer. The first polymer used according to the present invention may be present in the powder coating composition in an amount greater than 3 percent, by weight, or greater than 5 percent by weight, or greater than 10 percent by weight, or greater than 15 percent by weight, or greater than 20 percent by weight, or greater than 25 percent by weight, or greater than 30 percent by weight, or greater than 35 percent by weight, or greater than 40 percent by weight.

The second polymer may also be a polyester polymer or a non-polyester polymer. The second polymer may include an acrylic resin, a poly(vinyl chloride) "PVC" (including PVC copolymers), a polyethylene, a polyamide, a polyolefin, a polyester, a co-polyester (e.g., a polymer formed when modifications are made to a polyester), a polyimide, a polyurethane, or a mixture thereof.

The first polymer and the second polymer may be present in the powder coating composition in a weight range of 1:1 to 1:5, such as 1:1 to 1:4, such as 1:1 to 1:3, or such as 1:1 to 1:2. The first polymer and the second polymer may be present in the powder coating composition in a range from 60/40 to 30/70. The first polymer may be present in the powder coating composition in an amount of from 5 percent by weight to 95 percent by weight, based on total solids weight of the first polymer and the second polymer, and the second polymer may be present in the powder coating composition in an amount of from 5 percent by weight to 95 percent by weight, based on total solids weight of the first polymer and the second polymer.

The first polymer and the second polymer are different from one another. By "different from one another" it is meant that the monomer amounts and/or monomer types used to form the polymer may be different. The first polymer and the second polymer may each contain less than 25 wt % fluorine-containing monomeric units, and the powder coating composition may exclude any polymer having 25 wt % or more fluorine-containing monomeric units.

The powder coating composition may include a cross-linker. The cross-linker may be reactive with the first polymer. The cross-linker may be reactive with carboxylic acid groups of the first polymer, a hydroxyl-reactive cross-linker reactive with hydroxyl groups of the first polymer, or a mixture thereof. The cross-linker may include a non-phenolic epoxy cross-linker. The non-phenolic epoxy cross-linker may include hydroxyalkylamide, hydroxyalkylurea, carbodiimide, oxazoline, or a mixture thereof. The hydroxyl-reactive cross-linker may include a blocked isocyanate resin, melamine, an aminoplast, or a mixture thereof. The cross-linker may include a non-triglycidyl isocyanurate (TGIC) cross-linker reactive with carboxylic acid groups of the first polymer. However, in other examples, the cross-linker may include TGIC.

The first polymer may include an acrylic resin and the second polymer may include PVC or a PVC/polyvinyl acetate co-polymer.

The first polymer may include a polyester and the second polymer may include PVC or a PVC/polyvinyl acetate co-polymer.

The first polymer may include an acrylic resin, and the second polymer may include a polyolefin.

The first polymer may include a polyester and the second polymer may include a polyamide and/or a polyethylene. The powder coating composition may include a cross-linker, which may include a non-triglycidyl isocyanurate (TGIC) cross-linker reactive with carboxylic acid groups of the first polymer.

The first polymer may include an acrylic resin and the second polymer may include a polyolefin. The first polymer may be cross-linkable, and the powder coating composition may include a cross-linker reactive with the first polymer. The cross-linker may include a hydroxyalkyamide cross-linker, such as PRIMID®, commercially available from EMS Group (Domat/Ems, Switzerland).

The first polymer may include an acrylic resin or a polyamide wax, and the second polymer may include a polyamide.

The first polymer may include an acrylic resin and the second polymer may include a thermoplastic polymer (e.g., a thermoplastic acrylic, a thermoplastic polyamide, a thermoplastic polyolefin, or a thermoplastic polyester).

The first polymer may include a thermoset polyester and the second polymer may include a thermoplastic polyester. The powder coating composition may further include hydroxyalkyamide, oxazoline, or other suitable cross-linker reactive with the first polymer. The powder coating composition may be applied to an article including a package.

The first polymer may include an acrylic resin and the second polymer may include PVC.

The first polymer may include a polyester and the second polymer may include PVC.

The powder coating composition of the present invention can be used alone, or in combination with one or more other coating compositions, such as in a coating system having two or more layers. For example, the powder coating compositions of the present invention may include a colorant and may be used as a primer, a basecoat, and/or a top coat. For substrates coated with multiple coatings, one or more of those coatings can be coatings as described herein. The present coatings can also be used as a packaging "size" coating, wash coat, spray coat, end coat, and the like.

The powder coating composition may be used in a coating system, which may include an undercoat and an overcoat, the overcoat including the powder coating composition as previously described. The undercoat may include any suitable material, such as a polyester material, and benzoguanamine or a derivative thereof. The benzoguanamine or derivative thereof may include a commercially available benzoguanamine or a derivative thereof. Suitable examples of commercially available benzoguanamine and its derivatives include, but are not limited to, the following; benzoguanamine-formaldehyde based materials such as, CYMEL® 1123 (commercially available from Cytec Industries Inc. (Woodland Park, N.J.)), ITAMIN® BG143 (commercially available from Galstaff Multiresine S.p.A. (Mornago, Italy)) or MAPRENAL® BF892 (commercially available from Ineos (Rolle, Switzerland)); glycoluril based materials, such as, CYMEL 1170 and CYMEL 1172 (commercially available from Cytec Industries Inc. (Woodland Park, N.J.)); and combinations thereof.

The undercoat may include at least 1 wt %, such as, at least 2 wt %, at least 3 wt %, at least 4 wt %, or at least 4.5 wt % of benzoguanamine or a derivative thereof based on the total solid weight of the undercoat. The undercoat may include up to 40 wt %, such as, up to 30 wt %, up to 20 wt %, up to 15 wt %, or up to 10 wt % of benzoguanamine or a derivative thereof based on the total solid weight of the undercoat. The undercoat may include from 1 to 40 wt %, such as from 1 to 30 wt %, from 1 to 20 wt %, from 1 to 15 wt %, or from 1 to 10 wt % of benzoguanamine or a derivative thereof based on the total solid weight of the undercoat. The undercoat may include from 2 to 40 wt %, such as, from 2 to 30 wt %, from 2 to 20 wt %, from 2 to 15 wt %, or from 2 to 10 wt % of benzoguanamine or a derivative thereof based on the total solid weight of the undercoat. The undercoat may include from 3 to 40 wt %, such as, from 3 to 30 wt %, from 3 to 20 wt %, from 3 to 15 wt %, or from 3 to 10 wt % of benzoguanamine or a derivative thereof based on the total solid weight of the undercoat. The undercoat may include from 4 to 40 wt %, such as, from 4 to 30 wt %, from 4 to 20 wt %, from 4 to 15 wt %, or from 4 to 10 wt % of benzoguanamine or a derivative thereof based on the total solid weight of the undercoat. The undercoat may include from 4.5 to 40 wt %, such as, from 4.5 to 30 wt %, from 4.5 to 20 wt %, from 4.5 to 15 wt %, or from 4.5 to 10 wt % of benzoguanamine or a derivative thereof based on the total solid weight of the undercoat. The undercoat may be a liquid undercoat.

The powder coating composition of the present invention and/or the coating system containing the same may be may be substantially free, may be essentially free and/or may be completely free of bisphenol A and epoxy compounds derived from bisphenol A ("BPA"), such as bisphenol A diglycidyl ether ("BADGE"). Such powder coating compositions and/or coating systems are sometimes referred to as "BPA non intent" because BPA, including derivatives or residues thereof, are not intentionally added but may be present in trace amounts because of impurities or unavoidable contamination from the environment. The powder coating compositions and/or coating systems can also be substantially free, may be essentially free and/or may be completely free of bisphenol F ("BPF") and epoxy compounds derivatived from bisphenol F, such as bisphenol F diglycidyl ether ("BFDGE"). The term "substantially free" as used in this context means the powder coating compositions and/or coating systems contain less than 1000 parts per million (ppm), "essentially free" means less than 100 ppm, and "completely free" means less than 20 parts per billion (ppb) of any of the above mentioned compounds, derivatives or residues thereof.

The powder coating composition and/or the coating system may be may be substantially free, may be essentially free and/or may be completely free of triglycidyl isocyanurate (TGIC). The term "substantially free" as used in this context means the powder coating compositions and/or coating systems contain less than 1000 parts per million (ppm), "essentially free" means less than 100 ppm, and "completely free" means less than 20 parts per billion (ppb) of any of the above mentioned compounds, derivatives or residues thereof.

The powder coating composition and/or the coating system may be substantially free, may be essentially free, and/or may be completely free of dialkyltin compounds, including oxides or other derivatives thereof. Examples of dialkyltin compounds include, but are not limited to, one or more of the following: dibutyltindilaurate (DBTDL); dioctyltindilaurate; dimethyltin oxide; diethyltin oxide; dipropyltin oxide; dibutyltin oxide (DBTO); dioctyltinoxide (DOTO), or combinations thereof.

The powder coating composition and/or the coating system may be substantially free, may be essentially free and/or may be completely free of formaldehyde. The term "substantially free" as used in this context means the powder coating composition and/or the coating system contain, and/or release on cure, less than 1000 parts per million (ppm), "essentially free" means less than 100 ppm, and "completely free" means less than 100 parts per billion (ppb) of formaldehyde compounds, derivatives or residues thereof.

The undercoat, when applied by itself and cured, may have a flexibility of at least 20 mm, such as, at least 24 mm, or at least 25 mm, as measured according to the draw and re-draw test method with processing in 1% salt (NaCl) solution in tap water at 130° C. for 60 minutes and a scratch resistance of at least 700 g as measured according to ISO Standard 1518-1:2011.

The powder coating compositions of the present invention may be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented undercoat. The clearcoat can be formulated as is known in the coatings art.

The powder coating composition of the present invention may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, boats, ships, airplanes, helicopters and the like. It will be appreciated that the portion of the vehicle that is coated according to the present invention may vary depending on why the coating is being used. For example, anti-chip primers may be applied to some of the portions of the vehicle. When used as a colored basecoat or monocoat, the present coatings will typically be applied to those portions of the vehicle that are visible such as the roof, hood, doors trunk lid and the like of a car, but may also be applied to other areas such as inside the trunk, inside the door and the like especially when the compositions are formulated as sealants or adhesives; for example, the compositions can be formulated so as to have a viscosity such that they provide sound and/or vibration damping to a vehicle. The present compositions can also be applied to those portions of the vehicle that are in contact with the driver and/or passengers, such as the steering wheel, dashboard, gear shift, controls, door handle and the like. Clearcoats will typically be applied to the exterior of a vehicle.

The powder coating composition may include various other additives. Non-limiting examples of other additives that can be used with the coating composition of the present invention include: plasticizers, abrasion resistant particles, corrosion resistant particles, corrosion inhibiting additives, fillers including, but not limited to, clays, inorganic minerals, anti-oxidants, hindered amine light stabilizers, UV light absorbers and stabilizers, surfactants, flow and surface control agents, thixotropic agents, organic co-solvents, reactive diluents, catalysts, reaction inhibitors, and other customary auxiliaries.

The powder coating composition of the present invention may be prepared by mixing together to produce a mixture: the first polymer, the second polymer, and, optionally, the cross-linker. The polymer mixture may be ground using an air classifying mill to form a powder. The polymer mixture may be ground at temperatures above 4° C. to form the powder. However, it will be appreciated that the polymer mixture may be ground using conventional methods at cryogenic temperatures (at temperatures up to 4° C.) to form the powder. While, the powder coating compositions of the present invention may be ground using conventional methods at cryogenic temperatures, it may be advantageously ground according to the present invention at temperatures above 4° C. to form the powder. Thus, the powder coating compositions of the present invention may be grindable at a temperature above 4° C. to form a powder coating composition having an average particle size from 15 to 150 microns.

The powder may have an average particle size from 15 to 150 microns, such as from 20-45 microns, from 25-40 microns, from 30-35 microns, from 15-75 microns, from 15-80 microns, from 15-90 microns, from 15-100 microns, from 15-110 microns, from 15-120 microns, from 15-130 microns, or from 15-140 microns.

The polymer mixture may include a polymer dispersion of the first polymer, the second polymer, and a medium, with the medium removed before grinding. The medium may be removed by any known methods, such as, by drying (e.g., evaporating the medium from the polymer mixture). The polymer dispersion may be dried by spray drying, tray drying, freeze drying, fluid bed drying, single or double drum drying, flash drying, swirl drying, and/or microwave drying. The polymer mixture may be a dry mixture including the first polymer and the second polymer, and the dry mixture may be extruded to produce particulates before grinding.

The powder coating composition of the present invention, once prepared, may be applied to at least a portion of a substrate and cured to form a coating. Suitable application methods may include, but are not limited to, one or more of the following: electrostatic spray coating or dip coating.

The powder coating composition of the present invention may be applied to any substrates known in the art, for example, automotive substrates, marine substrates, industrial substrates, packaging substrates, lumber, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. These substrates can be, for example, metallic or non-metallic. Metallic substrates include tin, steel, tin-plated steel, chromium passivated steel, galvanized steel, aluminum, and aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect.

The present invention further includes a package coated at least in part with any of the powder coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage package or bakeware in which a consumer might make and/or store food; such a package would only maintain the freshness or integrity of the food item for a relatively short period. "Package" as used herein means the complete package itself or any component thereof, such as an end, lid, cap, and the like. For example, a "package" coated with any of the powder coating compositions described herein might include a metal can in which only the can end or a portion thereof is coated. A package according to the present invention can be made of metal or non-metal, for example, plastic or laminate, and be in any form. An example of a suitable package is a laminate tube. Another example of a suitable package is metal can. The term "metal can" includes any type of metal can, package or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, packages or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Thus a "metal can" also includes an aerosol can or tube and a monobloc aerosol can or tube. Packages coated according to the present invention can also include plastic bottles, plastic tubes, laminates and flexible packaging, such as those made from PE, PP, PET and the like. Such packaging could hold, for example, food, toothpaste, personal care products and the like.

The powder coating composition of the present invention may be applied to the interior and/or the exterior of the package. For example, the coating can be roll-coated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can be applied to the "side stripe" of a metal can, which will be understood as the seam formed during fabrication of a three-piece can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. The coating can be applied to can stock before formation of the can or can part, or can be applied to the can or can part after formation.

Any material used for the formation of food cans can be treated according to the present methods. Particularly suitable substrates include tin-plated steel, tin-free steel and black-plated steel.

The present invention is therefore further includes a method of coating a package comprising applying at least a portion of the package any of the powder coating compositions described above, and curing the coating. Two-piece cans are manufactured by joining a can body (typically a drawn metal body) with a can end (typically a drawn metal end). The coatings of the present invention are suitable for use in food contact situations and may be used on the inside of such cans. They are particularly suitable for spray applied, liquid coatings for the interior of two-piece drawn and ironed beverage cans and coil coatings for food can ends. The present invention also offers utility in other applications. These additional applications include, but are not limited to, wash coating, sheet coating, and side seam coatings (e.g., food can side seam coatings).

Spray coating includes the introduction of the powder coating composition into the inside of a preformed package. Typical preformed packages suitable for spray coating include food cans, beer and beverage packages, and the like. The spray may utilize a spray nozzle capable of uniformly coating the inside of the preformed package. The sprayed preformed package is then subjected to heat to remove the residual solvents and harden the coating. For food inside spray, the curing conditions involve maintaining the temperature measured at the can dome at 350 to 500° F. for 0.5 to 30 minutes.

A coil coating is described as the coating of a continuous coil composed of a metal (e.g., steel or aluminum). Once coated, the coating coil is subjected to a short thermal, ultraviolet, and/or electromagnetic curing cycle, for hardening (e.g., drying and curing) of the coating. Coil coatings provide coated metal (e.g., steel and/or aluminum) substrates that can be fabricated into formed articles, such as 2-piece drawn food cans, 3-piece food cans, food can ends, drawn and ironed cans and the like.

A sheet coating is described as the coating of separate pieces of a variety of materials (e.g., steel or aluminum) that have been pre-cut into square or rectangular "sheets." Typical dimensions of these sheets are approximately one square meter. Once coated, each sheet is cured. Once hardened (e.g., dried and cured), the sheets of the coated substrate are collected and prepared for subsequent fabrication. Sheet coatings provide coated metal (e.g., steel or aluminum) substrate that can be successfully fabricated into formed articles, such as 2-piece drawn food cans, 3-piece food cans, food can ends, drawn and ironed cans and the like.

A side seam coating is described as the spray application of a coating over the welded area of formed three-piece food cans. When three-piece food cans are being prepared, a rectangular piece of coated substrate is formed into a cylinder. The formation of the cylinder is rendered permanent due to the welding of each side of the rectangle via thermal welding. Once welded, each can typically require a layer of coating, which protects the exposed "weld" from subsequent corrosion or other effects to the contained foodstuff. The coatings that function in this role are termed "side seam stripes". Typical side seam stripes are spray applied and cured quickly via residual heat from the welding operation in addition to a small thermal, ultraviolet, and/or electromagnetic oven.

EXAMPLES

The following examples are presented to demonstrate the general principles of the invention. The invention should not be considered as limited to the specific examples presented.

Examples 1-2

Preparation of Nylon Containing Dispersion Powder Coating Compositions

Powder coating compositions containing polyamide were prepared from the components listed in Table 1.

TABLE 1

| Component | Example 1 | Example 2 |
|---|---|---|
| Acrylic Dispersion[1] | 15.8 g | 5.2 g |
| ME27720[2] | 5.2 g | 15.7 g |
| GRILTEX ® D 1428A[3] | 62.8 g | 62.7 g |
| Benzoin[4] | 0.5 g | 0.5 g |
| PL-200[5] | 0.5 g | 0.5 g |
| TINUVIN ® 144[6] | 0.2 g | 0.2 g |
| TINUVIN ® 405[7] | 0.2 g | 0.2 g |
| TIONA ® 121[8] | 15.0 g | 15.0 g |

[1]An aqueous dispersion of an acrylic polymer produced from a monomer mixture of 74% methyl methacrylate, 22% ethyl acrylate, and 4% methacrylic acid (Mn = 2005 and Tg = 69° C.)
[2]A polyamide wax dispersion in water commercially available from Michelman Inc. (Blue Ash, OH) (Tm = 115° C., as measured by the supplier)
[3]A free flowing nylon powder commercially available from EMS Group (Domat/Ems, Switzerland) (Tm = 175° C., as measured by the supplier)
[4]Benzoin, commercially available from Mitsubishi Chemical Corporation (Tokyo, Japan)
[5]Acrylic/silica flow and leveling control agent, commercially available from Estron Chemical Inc. (Calvert City, KY)
[6]A UV stabilizer commercially available from BASF (Ludwigshafen, Germany)
[7]A UV stabilizer commercially available from BASF (Ludwigshafen, Germany)
[8]Titanium Dioxide pigment commercially available from Fitz Chem Corporation (Itasca, IL)

The water containing components were weighed and placed into a container along with 0.1 g of water defoamer BYK-011 (from BYK-Chemie GMBH (Wesel, Germany)). All components except the GRILTEX® D 1428A were added to the water containing components slowly under high agitation with a cowles blade. The mixture was then moved to a Hockmeyer bead mill (Model #SHM-MM-4829) and milled at 3,000 rpm for ten minutes. The GRILTEX® D 1428A was then dispersed into the mixture using a cowles blade on high shear for 5 minutes.

The mixture's water was then evaporated using heat, leaving a solid material. The mixture's water was evaporated and the mixture dried using the following procedure. A Sussman Electric Boiler (Model #MBA18) drum dryer (Sussman Electric Boliers (Long Island City, N.Y.)) was connected to a Yaskawa Varispeed V7-4X speed controller (Yaskawa America (Waukegan, Ill.)) whose speed was programmed to 60 rpm drum speed. The drums were heated with steam at a pressure of 10 to 30 psi creating a temperature of 100° C. to 150° C. at the nip point between the two drums. The nip displacement was set to 1 mm or wider. The mixture was poured slowly into the area between the drums allowing for the boiling and evaporation of the water. The remaining solid material adhered to the drum where it passed through the nip and was scraped off by stationary razor blades pressed against the drum.

The dried mixture was milled in a Mikro ACM-1 Air Classifying Mill (Hosokawa Micron Powder Systems (Summit, N.J.)) at ambient temperature (~25° C.) to obtain a particle size range of 0.4 to 100 microns, with the average particle size being 35 microns. The particle size was determined by running the powder through a Beckman Coulter LS 13 320 Laser diffraction particle size analyzer (Beckman Coulter Inc. (Brea, Calif.)) to determine the volume average particle size. This was done by placing the powder in a cell, which is placed into the particle sizer. The vacuum nozzle's geometry created a vortex in which the powder is drawn upwards through the instrument. A laser in the instrument then diffracted depending on the particle size distribution. A readout on the computer program (LS 13320 SW) was then displayed on the screen. The curve begins at 0 microns particle size and estimates upwards of 1000 microns. Analysis of the distribution curve can provide the average particle size which may be a strong indicator of how the finished powder will behave.

The resulting coating compositions for each of the Examples 1 and 2 were solid particulate powder coating compositions that were free flowing.

Examples 3-4

Preparation of PVC Containing Dry Powder Coating Compositions

Powder coating compositions containing PVC were prepared from the components listed in Table 2.

TABLE 2

| Component | Example 3 | Example 4 |
|---|---|---|
| Dispersion PVC[9] | 80.1 g | 72 g |
| Pentaerythritol Tetrabenzoate[10] | 70.2 g | 61 g |
| Epoxy Resin[11] | 5.8 g | 4.8 g |
| Benzoin[4] | 1.6 g | 1.4 g |
| PL200 ®[5] | 1.6 g | 1.4 g |
| Zn Stearate | 3.1 g | 2.8 g |
| Barium Stearate | 3.1 g | 2.8 g |
| TINUVIN ® 144[6] | 1.6 g | 1.4 g |
| TINUVIN ® 405[7] | 1.6 g | 1.4 g |
| Titanium Dioxide[12] | 22.5 g | 40 g |
| Polyester resin[13] | 25 g | 0 g |
| Polycaprolactone[14] | 0 g | 10.8 g |
| TOTAL | 216.2 g | 199.8 g |

[9]A polyvinyl chloride homopolymer resin commercially available from Formosa Plastics Corp (Taiwan) (Tm = 226° C.)
[10]A benzoate based plasticizer and a phthalate based plasticizer commercially available from Lanxess Aktiengesellschaft (Cologne, Germany)
[11]An epoxy resin having epoxy functional groups, hydroxyl functional groups and an equivalent weight of 525 to 550, commercially available from Hexion Inc. (Columbus, OH)
[12]Titanium Dioxide pigment commercially available from Fitz Chem Corporation (Itasca, IL)
[13]A polyester resin produced from a monomer mixture of 60% polyethylene terephthalate flakes, 12.1% terephthalic acid, 12.1% isophthalic acid, 3% adipic acid, 9.3% neopentyl glycol, 3.5% trimethylolpropane (Mn = 2673, Tg = 61° C.)
[14]Capa 6500 polycaprolactone sold by Perstop (Malmö, Sweden) (Mn = 23000 and Tg = −60° C., as measured by the supplier)

The coating compositions were extruded and then milled (as in Examples 1-2) at ambient temperature (~25° C.) to obtain a particle size range (as measured in Examples 1-2) of 5 to 100 microns and an average particle size of 25 microns.

The resulting coating compositions for the Examples 3 and 4 were solid particulate powder coating compositions that were free flowing.

Examples 5-9

Preparation of Dispersion Powder Coating Compositions

Powder coating compositions containing polyamide were prepared from the components listed in Table 3.

TABLE 3

| Component | Example 5 | Example 6 |
|---|---|---|
| Acrylic Dispersion[1] | 18.3 g | 18.3 g |
| Deionized Water | 116.4 g | 97.4 g |
| VESTOSINT ® 2157[15] | 94.0 g | 0 g |
| RILSAN ® D50 Nat[16] | 0 g | 94 g |
| Titanium Dioxide[17] | 20.0 g | 20 g |
| RESIFLOW PL-200a[18] | 1.0 g | 1.0 g |

[15]Polyamide 12 powder from Evonik Industries (Essen, Germany) (Tm = 184° C., as measured by the supplier)
[16]Polyamide 11 powder from Evonik Industries (Essen, Germany) (Tm = 186° C., as measured by the supplier)
[17]TIOXIDE ® TR-93 from Huntsman Corporation (The Woodlands, TX)
[18]Flow and leveling control agent from Estron Chemical Inc. (Calvert City, KY)

Powder coating compositions containing polyolefin were prepared from the components listed in Table 4.

TABLE 4

| Component | Example 7 | Example 8 |
|---|---|---|
| Acrylic Dispersion[1] | 73.3 g | 146.52 g |
| CANVERA ® 1110[19] | 176.3 g | 131.7 g |
| Titanium Dioxide[17] | 30 g | 30 g |
| RESIFLOW PL-200a[18] | 1.0 g | 1.0 g |

[19]Polyolefin dispersion from Dow Chemical Company (Midland, MI) (Tm = 127° C.)

A powder coating composition containing polyester was prepared from the components listed in Table 5.

TABLE 5

| Component | Example 9 |
|---|---|
| Acrylic Dispersion[1] | 55.0 g |
| GRILTEX ® D1377D[20] | 82.0 g |
| Titanium Dioxide[17] | 25.0 g |
| BLANC FIXE MICRO ™[21] | 10.0 g |
| Micro Mica W1[22] | 5.0 g |
| BYK-3900P[23] | 1.0 g |
| BYK-3950P[24] | 1.0 g |
| CERAFLOUR ® 961[25] | 1.0 g |

[20]Thermoplastic polyester from EMS Group (Domat/Ems, Switzerland) (Tm = 155° C., as measured by the supplier)
[21]BLANC FIXE MICRO ™ from Sachtleben Chemie (Duisburg, Germany)
[22]Micro Mica from Omya (Oftringen, Switzerland)
[23]Anti-cratering additive from BYK-Chemie GMBH (Wesel, Germany)
[24]Leveling additive from BYK-Chemie GMBH (Wesel, Germany)
[25]Degassing additive from BYK-Chemie GMBH (Wesel, Germany)

In the preparation of Examples 5-9, the liquid containing components were weighed and placed into a container and then the powder materials were added to the liquid components slowly under agitation with a cowles blade. The mixture was then mixed for 15 minutes under high shear using a cowles blade. The mixture's water was then evaporated using heat, leaving a solid material (using the method described in Examples 1-2). The material was milled (as described in Examples 1-2) using a Mikro ACM-1 Air Classifying Mill at 20° C. to obtain a particle size range of 5 to 80 microns and an average particle size of 31 microns (as measured in Examples 1-2).

The resulting coating compositions for each of the Examples 5-9 were solid particulate powder coating compositions that were free flowing.

The powder coating compositions of Examples 5-9 were electrostatically sprayed on electrolytic tinplated steel using a Nordson Versa Spray II electrostatic sprayer (Nordson Corporation (Amherst, Ohio)). The powder coating composition was applied at a thickness of 50 to 110 microns. The powder coating composition was heated in a one-zone, gas-fired, conveyor oven for 20 seconds and baked to a peak metal temperature of 250° C. to form a coating.

Various characteristics of the resulting coatings of Examples 5-9 are shown in Table 6.

TABLE 6

| Test | Example 5 | Example 6 | Example 7 | Example 8 | Example 9 |
|---|---|---|---|---|---|
| MEK Resistance | 100 | 100 | 100 | 100 | 100 |
| Cross-hatch Adhesion | 4B | 4B | 5B | 5B | 5B |
| Wedge Bend Test | 68 mm | 58 mm | 45 mm | 55 mm | 45 mm |
| 20 in-lb Direct Impact | No Crack | No Crack | No Crack | No Crack | No Crack |
| Deionized Water Retort | 0B | 0B | 5B | 5B | 5B |

The MEK double rub test rub used a gauze covered hammer that was saturated with methyl ethyl ketone. The coatings of Examples 5-9 were evaluated for the number of double rubs it took to soften and break through the coating or reached 100 double rubs.

The cross-hatch adhesion testing was performed to assess whether the coating adhered to the substrate. The adhesion test was performed according to ASTM D 3359 Test Method B, using Scotch 610 tape, available from 3M Company (Maplewood, Minn.)

The wedge bend test included bending a coated test specimen over a 3 mm mandrel to form a test wedge. The test wedge was then impacted along the deformation axis with a 2.4 kg weight dropped from a height of 60 cm. The millimeters of coating failure along the deformation axis of the test wedge is reported.

The 20 in-lb direct impact test was used to determine resistance to cracking caused by direct impact and was measured in accordance with ASTM D2794.

Deionized Water Retort was designed to measure the resistance of a coating to deionized water. Coated strips were immersed into the deionized water and placed in a steam retort for 30 minutes at 250° F. (121° C.). The strips were then cooled in deionized water, dried, and immediately rated for adhesion as described previously.

Examples 10-13

Preparation of Dry Powder Coating Compositions

A powder coating composition containing thermoplastic polyester and acrylic was prepared from the components listed in Table 7.

TABLE 7

| Component | Example 10 |
|---|---|
| GRILTEX ® D1377E[26] | 67.0 g |
| DEGALAN ® LP67/11[27] | 30.0 g |
| Titanium Dioxide[17] | 25.0 g |
| BLANC FIXE MICRO ™[21] | 10.0 g |
| Micro Mica W1[22] | 5.0 g |
| BYK-3900P[23] | 1.0 g |

TABLE 7-continued

| Component | Example 10 |
|---|---|
| BYK-3950P[24] | 1.0 g |
| CERAFLOUR ® 961[25] | 1.0 g |

[26]Thermoplastic polyester having a Tg of 25° C. and a Tm of 150° C.-160° C. from EMS Group (Domat/Ems, Switzerland), as measured by the supplier
[27]Acrylic resin from Evonik Industries (Essen, Germany) (Mw = 37,000 and Tg = 85° C., as measured by the supplier)

Powder coating compositions containing polyester were prepared from the components listed in Table 8.

TABLE 8

| Component | Example 11 | Example 12 | Comparative Example 13 |
|---|---|---|---|
| GRILTEX ® D1377E[26] | 57.0 g | 55.0 g | 97 g |
| Thermoset Polyester[28] | 40.0 g | 40.0 g | 0 g |
| Titanium Dioxide[17] | 25.0 g | 25.0 g | 25.0 g |
| BLANC FIXE MICRO ™[21] | 10.0 g | 10.0 g | 10.0 g |
| Micro Mica W1[22] | 5.0 g | 5.0 g | 5.0 g |
| BYK-3900P[23] | 1.0 g | 1.0 g | 1.0 g |
| BYK-3950P[24] | 1.0 g | 1.0 g | 1.0 g |
| CERAFLOUR ® 961[25] | 1.0 g | 1.0 g | 1.0 g |
| PRIMID ® QM-1260[29] | 0 g | 2.0 g | 0 g |

[28]An acid functional polyester resin having an acid value of 33 and a Tg of 55° C. prepared from a reaction mixture of 40% terepthalic acid, 3% adipic acid, 19.5% isophthalic acid, 37.5% neopentyl glycol (Mn = 4218)
[29]Hydroxyalkylamide crosslinker from EMS Group (Domat/Ems, Switzerland)

Examples 10-12 were prepared using the components and amounts (parts by weight in grams) shown in Tables 7 and 8. The coating compositions were prepared by premixing the ingredients in a three-blade mixer rotating at 3500 rpm. The premix was then extruded in a 19 mm dual screw extruder operating at a temperature of 110° C. The extrudate was rapidly cooled and pressed into a chip. The addition of 0.3% AEROSIL® 200 from Evonik Industries (Essen, Germany) was added to the chip prior to milling. The chip was micronized to a particle size of 20-50 microns (as measured in Examples 1-2) using a Mikro ACM-1 Air Classifying Mill (as described in Examples 1-2) at 20° C. The average particle size for Example 10 was 27.5 microns (as described in Examples 1-2). The average particle size for Example 11 was 27.8 microns (as described in Examples 1-2). The average particle size for Example 12 was 27.73 microns (as described in Examples 1-2).

Comparative Example 13 was prepared using the components and amounts (parts by weight in grams) shown in Table 8. The coating composition was prepared by premixing the ingredients in a three-blade mixer rotating at 3500 rpm. The premix was then extruded in a 19 mm dual screw extruder operating at a temperature of 110° C. The extrudate was rapidly cooled, but could not be pressed into a chip due to the lack of brittleness of the material at ambient conditions. Since the extrudate could not be pressed into chip form, it was not grindable.

The powder coating compositions were electrostatically sprayed on electrolytic tinplated steel using a Nordson Versa Spray II electrostatic sprayer (Nordson Corporation (Amherst, Ohio)). The powder coating compositions were applied at a thickness of 50 to 110 microns. The powder coated panels were heated in a one-zone, gas-fired, conveyor oven for 15 seconds to obtain a peak metal temperature of 260° C. to form a coating.

Various characteristics of the resulting coatings of Examples 10-12 are shown in Table 9. The tests performed on Examples 10-12 are identical to those performed on Examples 5-9, previously described.

TABLE 9

| Test | Example 10 | Example 11 | Example 12 |
| --- | --- | --- | --- |
| MEK Resistance | 100 | 100 | 100 |
| Cross-hatch Adhesion | 5B | 5B | 5B |
| Wedge Bend Test | 14 mm | 85 mm | 9 mm |
| 20 in-lb Direct Impact | No Crack | Slight Crack | No Crack |
| Deionized Water Retort | 5B | 3B | 5B |

The present invention further includes the subject matter of the following clauses: Clause 1: A powder coating composition comprising: (a) a first polymer having a number average molecular weight (Mn) of more than 1,000 and a Tg of at least 40° C.; (b) a second polymer having a Tm of at least 100° C.; and (c) a cross-linker, wherein the first polymer and the second polymer are different from one another and each of the first and second polymers have less than 25 wt % fluorine-containing monomeric units, with wt % based on the total weight of the monomer units in each polymer having an average particle size from 15 to 150 microns.

Clause 2: A powder coating composition comprising: (a) a first non-polyester polymer having a number average molecular weight (Mn) of more than 1,000 and a Tg of at least 40° C.; and (b) a second polymer having a Tm of at least 100° C., wherein the first polymer and the second polymer are different from one another and each of the first and second polymers have less than 25 wt % fluorine-containing monomeric units, with wt % based on the total weight of the monomer units in each polymer and having an average particle size from 15 to 150 microns.

Clause 3: A powder coating composition comprising: (a) a first polymer having a number average molecular weight (Mn) of more than 1,000 and a Tg of at least 40° C.; and (b) a second polymer comprising poly(vinyl chloride), the second polymer having a Tm of at least 100° C., wherein the first polymer and the second polymer are different from one another, and having an average particle size from 15 to 150 microns.

Clause 4: The powder coating composition of clause 2, wherein the first polymer is cross-linkable and the composition further comprises a cross-linker.

Clause 5: The powder coating composition of clause 2 or 4, wherein the first polymer comprises an acrylic resin, and the second polymer comprises poly(vinyl chloride).

Clause 6: The powder coating composition of clause 3, wherein the first polymer comprises a polyester.

Clause 7: The powder coating composition of clause 2 or 4, wherein the first polymer comprises an acrylic resin, and the second polymer comprises a polyolefin.

Clause 8: The powder coating composition of clause 7, further comprising a hydroxyalkyamide cross-linker.

Clause 9: The powder coating composition of clause 1, wherein the first polymer comprises a polyester having carboxylic acid groups, the second polymer comprises a polyamide and/or a polyethylene, and the cross-linker comprises a non-triglycidyl isocyanurate (TGIC) cross-linker reactive with the carboxylic acid groups of the first polymer.

Clause 10: The powder coating composition of clause 2 or 4, wherein the first polymer comprises an acrylic resin or a polyamide wax, and the second polymer comprises a polyamide.

Clause 11: The powder coating composition of clause 2 or 4, wherein the first polymer comprises an acrylic resin, and the second polymer comprises a thermoplastic acrylic resin, polyamide, polyolefin and/or polyester.

Clause 12: The powder coating composition of clause 1, wherein the first polymer comprises a thermoset polyester and the second polymer comprises a thermoplastic polyester.

Clause 13: The powder coating composition of clause 12, wherein the cross-linker comprises hydroxyalkyamide or oxazoline.

Clause 14: A method of preparing a powder coating composition comprising: (i) mixing together to produce a polymer mixture: (a) a first polymer having a number average molecular weight (Mn) of more than 1,000 and a Tg of at least 40° C.; (b) a second polymer different from the first polymer, wherein the second polymer has a Tm of at least 100° C.; wherein each of the first polymer and the second polymer have less than 25 wt % fluorine-containing monomeric units, with wt % based on the total weight of the monomer units; and (c) a cross-linker, and (ii) grinding the polymer mixture of (i) to form the powder coating composition having an average particle size from 15 to 150 microns.

Clause 15: A method of preparing a powder coating composition comprising: (i) mixing together to produce a polymer mixture: (a) a non-polyester first polymer having a number average molecular weight (Mn) of more than 1,000 and a Tg of at least 40° C.; and (b) a second polymer different from the first polymer, wherein the second polymer has a Tm of at least 100° C., wherein each of the first polymer and the second polymer have less than 25 wt % fluorine-containing monomeric units, with wt % based on the total weight of the monomer units; and (ii) grinding the polymer mixture of (i) to form the powder coating composition having an average particle size from 15 to 150 microns.

Clause 16: A method of preparing a powder coating composition comprising: (i) mixing together to produce a polymer mixture: (a) a first polymer having a number average molecular weight (Mn) of more than 1,000 and a Tg of at least 40° C.; and (b) a second polymer comprising poly(vinyl chloride), the second polymer having a Tm of at least 100° C., wherein the second polymer has a Tm of at least 100° C.; and (ii) grinding the polymer mixture of (i) to form the powder coating composition having an average particle size from 15 to 150 microns.

Clause 17: The method of any of clauses 14-16, wherein the polymer mixture comprises a polymer dispersion comprising the first polymer the second polymer, the crosslinker if present, and a medium, wherein the medium is removed before step (ii).

Clause 18: The method of any of clauses 14-16, wherein the polymer mixture is a dry mixture comprising the first polymer, the second polymer, and the crosslinker if present wherein the dry mixture is extruded to produce particulates of the polymer mixture before step (ii).

Clause 19: The method of any of clauses 14-18, wherein the polymer mixture is ground at a temperature above 4° C.

Clause 20: A coating system comprising: an undercoat; and an overcoat coating composition comprising the powder coating composition of any of clauses 1-13.

Clause 21: A substrate at least partially coated with the powder coating composition of any of clauses 1-13.

Clause 22: The substrate of clause 21, wherein the substrate comprises a vehicle.

Clause 23: A package at least partially coated with the powder coating composition of clause 7, 8, 10, or 12.

Clause 24: A package at least partially coated with the powder coating composition of clause 11.

Clause 25: The package of clause 23 or 24, wherein the package comprises a metal can, an aerosol can or tube, or a monobloc aerosol can or tube.

Clause 26: The package of clause 24, wherein the package comprises a metal can, and the powder coating composition is applied to a side stripe of the metal can.

Clause 27: A coil spring at least partially coated with the powder coating composition of clause 9.

Clause 28: The powder coating composition of any of clauses 1-13, wherein the second polymer has a Tg of at least −40° C.

Clause 29: The powder coating composition of any of clauses 1-13 or 28, wherein the first polymer has a number average molecular weight (Mn) of no more than 5,000.

Clause 30: The powder coating composition of any of clauses 1-13, 28 or 29, wherein the coating composition is substantially free of bisphenol A (BPA), bisphenol F (BPF), bisphenol A diglycidyl ether (BADGE), bisphenol F diglycidyl ether (BFDGE), and triglycidyl isocyanurate (TGIC).

Clause 31: The powder coating composition of any of clauses 1-13 or 28-30, wherein the second polymer has a number average molecular weight (Mn) of at least 5,000.

Clause 32: The powder coating composition of any of clauses 1-13 or 28-31, wherein the first polymer and the second polymer are present in the powder coating composition in a weight range of 1:1 to 1:2.

Clause 33: The powder coating composition of clause 1 or 4, wherein the cross-linker comprises a cross-linker reactive with the first polymer having carboxylic acid groups, or a hydroxyl-reactive cross-linker reactive with the first polymer having hydroxyl groups, or a mixture thereof.

Clause 34: The powder coating composition of any of clauses 1-13 or 28-33, wherein the first polymer is water dispersible.

Clause 35: The powder coating composition of any of clauses 1-13 or 28-34, wherein the second polymer comprises a poly(vinyl chloride), a polyethylene, a polyamide, a polyolefin, a polyester, a co-polyester, a polyimide, a polyurethane, or a mixture thereof.

Clause 36: The powder coating composition of any of clauses 1-13 or 28-35, wherein the first polymer comprises an acrylic, a polyamide wax, a polyester, polyester grafted acrylic, a polyurethane, or a mixture thereof.

Clause 37: The powder coating composition of any of clauses 1-13 or 28-36, wherein the first polymer is present in the powder coating composition in an amount of from 5 percent by weight to 95 percent by weight, based on total solids weight of the first polymer and the second polymer, and the second polymer is present in the powder coating composition in an amount of from 5 percent by weight to 95 percent by weight, based on total solids weight of the first polymer and the second polymer.

Clause 38: The powder coating composition of any of clauses 1-13 or 28-37, further comprising at least one of a color pigment, an extender pigment, and/or a filler.

Clause 39: The powder coating composition of any of clauses 1-13 or 28-38, wherein the first polymer has a Tg of at least 45° C.

Clause 40: The powder coating composition of any of clauses 1-13 or 28-39, wherein the first polymer has a Tg of at least 60° C.

Clause 41: The powder coating composition of any of clauses 1-13 or 28-40, wherein the first polymer acts as a plasticizer in the coating composition.

Clause 42: The powder coating composition of any of clauses 1-13 or 28-41, wherein the average particle size ranges from 15-50 microns, or from 20-45 microns, or from 25-40 microns, or from 30-35 microns, or from 15-75 microns, or from 15-80 microns, or from 15-90 microns, or from 15-100 microns, or from 15-110 microns, or from 15-120 microns, or from 15-130 microns, or from 15-140 microns.

Clause 43: The powder coating composition of any of clauses 1-13 or 28-42, wherein the first polymer has a number average molecular weight (Mn) of more than 2,000.

Clause 44: The powder coating composition of any of clauses 1-13 or 28-43, wherein the second polymer has a Tg of −40° C. to 90° C., or −35° C. to 80° C., or −25° C. to 70° C., or −15° C. to 60° C., or −5° C. to 50° C., or 0° C. to 40° C.

Clause 45: The powder coating composition of clause 33, wherein the cross-linker comprises hydroxyalkyamide, hydroxyalkylurea, carbodiimide, oxazoline, or a mixture thereof.

Clause 46: The powder coating composition of any of clauses 1-13 or 28-45, wherein the second polymer is present in the powder coating composition in an amount greater than 20 percent by weight, or greater than 25 percent by weight, or greater than 30 percent by weight, or greater than 35 percent by weight, or greater than 40 percent by weight, or greater than 45 percent by weight, or greater than 50 percent by weight, or greater than 55 percent by weight, or greater than 60 percent by weight, or greater than 65 percent by weight, or greater than 70 percent by weight, based on total solids weight of the first polymer and the second polymer.

Clause 47: The powder coating composition of any of clauses 1-13 or 28-46, wherein the first polymer is acid functional.

Clause 48: The powder coating composition of clause 33, wherein the hydroxyl-reactive cross-linker comprises a blocked isocyanate resin, melamine, an aminoplast, or a mixture thereof.

Clause 49: The powder coating composition of any of clauses 1-13 or 28-48, wherein the first polymer has a number average molecular weight (Mn) from 1,000 to 7,000.

Clause 50: The powder coating composition of any of clauses 1-13 or 28-49, wherein the first polymer has a number average molecular weight (Mn) from 1,000 to 5,000.

Clause 51: The powder coating composition of any of clauses 1-13 or 28-50, wherein the first polymer has a number average molecular weight (Mn) of no more than 4,000.

Clause 52: The powder coating composition of any of clauses 1-13 or 28-51, wherein the first polymer has a weight average molecular weight (Mw) of no more than 15,000.

Clause 53: The powder coating composition of any of clauses 1-13 or 28-52, wherein the first polymer has a weight average molecular weight (Mw) of no more than 12,000.

Clause 54: The powder coating composition of any of clauses 1-13 or 28-53, wherein the first polymer has a weight average molecular weight (Mw) of no more than 10,000.

Clause 55: The powder coating composition of any of clauses 1-13 or 28-54, wherein the first polymer has a weight average molecular weight (Mw) of no more than 8,000.

Clause 56: The coating system of clause 20, wherein the undercoat comprises: a polyester material and benzoguanamine or a derivative thereof.

Clause 57: The coating system of any of clauses 20 or 56, wherein the coating system is substantially free of bisphenol A (BPA), bisphenol F (BPF), bisphenol A diglycidyl ether (BADGE), bisphenol F diglycidyl ether (BFDGE), and triglycidyl isocyanurate (TGIC).

Clause 58: The coating system of any of clauses 20, 56, or 57, wherein the undercoat, when cured, has a flexibility of at least 20 mm as measured according to the draw and re-draw test method with processing in 1% salt (NaCl) solution in tap water at 130° C. for 60 minutes and a scratch resistance of at least 700 g as measured according to ISO Standard 1518-1:2011.

Clause 59: The coating system of any of clauses 20 or 56-58, wherein the undercoat comprises at least 1 wt % of benzoguanamine or a derivative thereof based on the total solid weight of the coating composition.

Clause 60: The coating system of any of clauses 20 or 56-59, wherein the undercoat comprises at least 4.5 wt % of benzoguanamine or a derivative thereof based on the total solid weight of the coating composition.

Clause 61: The method of clause 17, wherein the polymer dispersion is dried by spray drying, tray drying, freeze drying, fluid bed drying, single or double drum drying, flash drying, swirl drying, and/or microwave drying.

Clause 62: The package of any of clauses 23-26, wherein the package is coated on at least a portion thereof with the powder coating composition, wherein the powder coating composition is substantially free of bisphenol A (BPA), bisphenol F (BPF), bisphenol A diglycidyl ether (BADGE), bisphenol F diglycidyl ether (BFDGE), and triglycidyl isocyanurate (TGIC).

Clause 63: A powder coating composition comprising: (a) a first polymer grindable above 4° C. by itself; and (b) a second polymer not grindable above 4° C. by itself, wherein the first polymer and the second polymer are different from one another and each of the first and second polymers have less than 25 wt % fluorine-containing monomeric units, with wt % based on the total weight of the monomer units in each polymer, and wherein, upon grinding at a temperature above 4° C., the coating composition has an average particle size from 15 to 150 microns.

Clause 64: The substrate of any of clauses 21, wherein the substrate comprises a package.

Clause 65: The substrate of clause 59, wherein the package comprises a metal can, an aerosol can or tube, or a monobloc aerosol can or tube Whereas particular embodiments of this invention have been described above for purposes of illustration, it will be evident to those skilled in the art that numerous variations of the details of the present invention may be made without departing from the invention as defined in the appended claims.

The invention claimed is:

1. A powder coating composition grindable at non-cryogenic temperatures comprising:
    (a) a first polymer having a number average molecular weight (Mn) of more than 1,000 and a Tg of at least 40° C.;
    (b) a second polymer having a Tm of at least 100° C.; and
    (c) a cross-linker,
    wherein the first polymer and the second polymer are different from one another and each of the first and second polymers have less than 25 wt % fluorine-containing monomeric units, with wt % based on the total weight of the monomeric units in each polymer; and
    wherein upon grinding at a temperature above 4° C. the coating composition has an average particle size from 15 to 150 microns,
    wherein the first polymer comprises a thermoset polymer and the second polymer comprises a thermoplastic polymer.

2. The powder coating composition of claim 1, wherein the first polymer comprises a polyester having carboxylic acid groups, the second polymer comprises a polyamide and/or a polyethylene, and the cross-linker comprises a non-triglycidyl isocyanurate (TGIC) cross-linker reactive with the carboxylic acid groups of the first polymer.

3. The powder coating composition of claim 1, wherein the first polymer comprises a thermoset polyester and the second polymer comprises a thermoplastic polyester.

4. The powder coating composition of claim 3, wherein the cross-linker comprises hydroxyalkyamide and/or oxazoline.

5. A method of preparing a powder coating composition according to claim 1 comprising:
    (i) mixing together to produce a polymer mixture:
        (a) a first polymer having a number average molecular weight (Mn) of more than 1,000 and a Tg of at least 40° C.;
        (b) a second polymer different from the first polymer, wherein the second polymer has a Tm of at least 100° C.;
        wherein each of the first polymer and the second polymer have less than 25 wt % fluorine-containing monomeric units, with wt % based on the total weight of the monomeric units, wherein the first polymer comprises a thermoset polymer and the second polymer comprises a thermoplastic polymer; and
        (c) a cross-linker,
    wherein the polymer mixture of (i) is grindable at a temperature above 4° C. to form a powder coating composition having an average particle size from 15 to 150 microns; and
    (ii) grinding the polymer mixture of (i) to form the powder coating composition having an average particle size from 15 to 150 microns.

6. The method of claim 5, wherein the polymer mixture comprises a polymer dispersion comprising the first polymer, the second polymer, and a medium, wherein the medium is removed before step (ii).

7. The method of claim 5, wherein the polymer mixture is a dry mixture comprising the first polymer and the second polymer, wherein the dry mixture is extruded to produce particulates of the polymer mixture before step (ii).

8. A coating system comprising:
    an undercoat; and
    an overcoat coating composition comprising the powder coating composition of claim 1.

9. A substrate at least partially coated with the powder coating composition of claim 1.

10. The substrate of claim 9, wherein the substrate comprises a vehicle.

11. The substrate of claim 9, wherein the substrate comprises a package.

12. The substrate of claim 11, wherein the package comprises a metal can, an aerosol can or tube, or a monobloc aerosol can or tube.

13. A coil spring at least partially coated with the powder coating composition of claim 2.

14. A powder coating composition grindable at non-cryogenic temperatures comprising:
    (a) a first non-polyester polymer having a number average molecular weight (Mn) of more than 1,000 and a Tg of at least 40° C.;

(b) a second polymer having a Tm of at least 100° C.; and
(c) a cross-linker reactive with the first polymer,
wherein the first polymer and the second polymer are different from one another and each of the first and second polymers have less than 25 wt % fluorine-containing monomeric units, with wt % based on the total weight of the monomeric units in each polymer; and
wherein upon grinding at a temperature above 4° C. the coating composition has an average particle size from 15 to 150 microns,
wherein the first polymer comprises a thermoset polymer and the second polymer comprises a thermoplastic polymer.

15. The powder coating composition of claim 14, wherein the first polymer comprises a carboxylic acid group and/or a hydroxyl group, and the cross-linker is reactive with the carboxylic acid group and/or the hydroxyl group of the first polymer.

16. The powder coating composition of claim 14, wherein:
the first polymer comprises an acrylic resin; and
the second polymer comprises poly(vinyl chloride).

17. The powder coating composition of claim 14, wherein:
the first polymer comprises an acrylic resin; and
the second polymer comprises a polyolefin.

18. The powder coating composition of claim 17, wherein the cross-linker comprises a hydroxyalkyamide cross-linker.

19. The powder coating composition of claim 14, wherein:
the first polymer comprises an acrylic resin or a polyamide wax; and
the second polymer comprises a polyamide.

20. The powder coating composition of claim 14, wherein:
the first polymer comprises an acrylic resin; and
the second polymer comprises a thermoplastic acrylic resin, polyamide, polyolefin and/or polyester.

21. A method of preparing a powder coating composition according to claim 14 comprising:
(i) mixing together to produce a polymer mixture:
(a) a non-polyester first polymer having a number average molecular weight (Mn) of more than 1,000 and a Tg of at least 40° C.;
(b) a second polymer different from the first polymer, wherein the second polymer has a Tm of at least 100° C.; and
(c) a cross-linker reactive with the first polymer,
wherein each of the first polymer and the second polymer have less than 25 wt % fluorine-containing monomeric units, with wt % based on the total weight of the monomeric units,
wherein the first polymer comprises a thermoset polymer and the second polymer comprises a thermoplastic polymer,
wherein the polymer mixture of (i) is grindable at a temperature above 4° C. to form a powder coating composition having an average particle size from 15 to 150 microns; and
(ii) grinding the polymer mixture of (i) to form the powder coating composition having an average particle size from 15 to 150 microns.

22. The method of claim 21, wherein the polymer mixture comprises a polymer dispersion comprising the first polymer the second polymer, and a medium, wherein the medium is removed before step (ii).

23. The method of claim 21, wherein the polymer mixture is a dry mixture comprising the first polymer and the second polymer, wherein the dry mixture is extruded to produce particulates of the polymer mixture before step (ii).

24. A coating system comprising:
an undercoat; and
an overcoat coating composition comprising the powder coating composition of claim 14.

25. A substrate at least partially coated with the powder coating composition of claim 14.

26. The substrate of claim 25, wherein the substrate comprises a vehicle.

27. The substrate of claim 25, wherein the substrate comprises a package.

28. The substrate of claim 27, wherein the package comprises a metal can, an aerosol can or tube, or a monobloc aerosol can or tube.

29. A powder coating composition grindable at non-cryogenic temperatures comprising:
(a) a first polymer having a number average molecular weight (Mn) of more than 1,000 and a Tg of at least 40° C.;
(b) a second polymer comprising poly(vinyl chloride), the second polymer having a Tm of at least 100° C.; and
(c) a cross-linker reactive with the first polymer,
wherein the first polymer and the second polymer are different from one another;
wherein upon grinding at a temperature above 4° C. the coating composition has an average particle size from 15 to 150 microns; and
wherein the first polymer comprises a thermoset polymer and the second polymer comprises a thermoplastic polymer.

30. The powder coating composition of claim 29, wherein, the first polymer comprises a polyester.

31. A method of preparing a powder coating composition according to claim 29 comprising:
(i) mixing together to produce a polymer mixture:
(a) a first polymer having a number average molecular weight (Mn) of more than 1,000 and a Tg of at least 40° C.;
(b) a second polymer comprising poly(vinyl chloride), the second polymer having a Tm of at least 100° C.; and
(c) a cross-linker reactive with the first polymer,
wherein the polymer mixture of (i) is grindable at a temperature above 4° C. to form a powder coating composition having an average particle size from 15 to 150 microns,
wherein the first polymer comprises a thermoset polymer and the second polymer comprises a thermoplastic polymer; and
(ii) grinding the polymer mixture of (i) to form the powder coating composition having an average particle size from 15 to 150 microns.

32. The method of claim 31, wherein the polymer mixture comprises a polymer dispersion comprising the first polymer the second polymer, and a medium, wherein the medium is removed before step (ii).

33. The method of claim 31, wherein the polymer mixture is a dry mixture comprising the first polymer and the second polymer, wherein the dry mixture is extruded to produce particulates of the polymer mixture before step (ii).

34. A coating system comprising:
an undercoat; and
an overcoat coating composition comprising the powder coating composition of claim 29.

35. A substrate at least partially coated with the powder coating composition of claim 29.

36. The substrate of claim 35, wherein the substrate comprises a vehicle.

37. The substrate of claim 35, wherein the substrate comprises a package.

38. The substrate of claim 37, wherein the package comprises a metal can, an aerosol can or tube, or a monobloc aerosol can or tube.

* * * * *